(12) United States Patent
Lee

(10) Patent No.: US 7,571,335 B2
(45) Date of Patent: Aug. 4, 2009

(54) PROCESSOR WITH VARIABLE WAKE-UP AND SLEEP LATENCY AND METHOD FOR MANAGING POWER THEREIN

(75) Inventor: Hoi-Jin Lee, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 437 days.

(21) Appl. No.: 11/373,208

(22) Filed: Mar. 13, 2006

(65) Prior Publication Data
US 2006/0206737 A1    Sep. 14, 2006

(30) Foreign Application Priority Data
Mar. 14, 2005   (KR) ............... 10-2005-0021065

(51) Int. Cl.
*G06F 1/26* (2006.01)
(52) U.S. Cl. ........................ 713/330; 713/323
(58) Field of Classification Search ........... 713/330, 713/323, 324; 703/27
See application file for complete search history.

(56) References Cited

U.S. PATENT DOCUMENTS 6,609,209 B1    8/2003   Tiwari et al.
7,137,021 B2*   11/2006  Dhong et al. ............... 713/324
2002/0002664 A1  1/2002  Kuermerle
2003/0005340 A1  1/2003  Ku
2003/0105984 A1* 6/2003  Masuyama et al. .......... 713/330

FOREIGN PATENT DOCUMENTS

EP           0284276         9/1988

OTHER PUBLICATIONS

Search and Examination Report for corresponding GB Application No. 0605116.3 dated Jul. 20, 2006.

* cited by examiner

*Primary Examiner*—Thuan N Du
(74) *Attorney, Agent, or Firm*—Harness, Dickey & Pierce, PLC

(57) ABSTRACT

For a processor having a plurality of sequential stages, variable (or idiosyncratic) wake-up latencies and a method for managing power in such a processor are provided. Each sequential stage includes one or more logic blocks and one or more power switches. A power controller can measure wake-up latencies for the logic blocks and control the power switches of the logic blocks by referring to the measured wake-up latencies, respectively.

11 Claims, 4 Drawing Sheets

PROCESSOR WITH VARIABLE WAKE-UP AND SLEEP LATENCY AND METHOD FOR MANAGING POWER THEREIN

PRIORITY STATEMENT

This application claims the priority of Korean Patent Application No. 10-2005-0021065, filed on Mar. 14, 2005, the disclosure of which is incorporated herein in its entirety by reference.

BACKGROUND

1. Field of the Invention

The present invention relates to a processor, and more particularly, to a processor capable of managing power consumption.

2. Description of the Related Art

Generally, methods for controlling a system supply voltage or for controlling a clock frequency are used for reducing power consumption in systems requiring minimized power consumption. In this case, a dynamic current according to the clock frequency is reduced and thus the power consumption is also effectively reduced. However, power consumption caused by a static current due to a power supply voltage or a leakage current cannot be reduced.

To reduce the wasteful leakage current, a power-gating technique is used for directly cutting off power. However, the power-gating technique requires a wake-up operation and exhibits a wake-up latency. The wake-up operation is an operation that makes the processor return to a normal mode from a sleep mode, and the wake-up latency is a time that is taken to finish the wake-up operation. After power is restored, a sufficient recovery time must elapse before the processor enters a state in which a stable operation can be secured. During the recovery time, all operations have to be stopped. In addition, even when switching to a sleep mode, power cannot be cut off until pipeline instructions are all finished. In this case, power has to be supplied until completing an operation of a pipeline corresponding to a stage that executes the last instruction. Consequently, power is unnecessarily supplied to circuits that do not execute the instruction and the static current is unnecessarily consumed.

FIG. 1 is a block diagram of sequential stages that execute instructions in a conventional microprocessor and, in the context thereof, a conventional method of cutting off power will be discussed.

Referring to FIG. 1, the conventional microprocessor includes instruction processing stages (stage 1, stage 2, etc.) and a power switching unit 20. Each of the power switches (P1, P2, etc.) within the unit 20 is configured with a transistor as a logic circuit for each of the instruction processing stages. When switching to a normal mode from a sleep mode or vice versa, power is managed by collectively controlling the power switches in the circuits of all stages.

A reference numeral 10 represents sequential stages of instruction execution in the conventional microprocessor. The execution of the sequential instructions includes a fetch stage for fetching the instructions from a memory (not shown), a decode stage for decoding the instructions, an issue stage for issuing the instructions, an execute stage for executing the instructions, and a write-back stage for writing the execution result data. However, since each of the stages can be added or omitted according to designs of the microprocessor, a detailed description thereof will be omitted for the sake of convenience. It should be noted that the processing of the instructions are classified into temporal divisions and logic blocks responsible for operations according to time in execution of instructions. Additionally, there are power switches corresponding to the divided logic blocks. In FIG. 1, these detailed operations of the stages are omitted and five stages are provided to categorize temporal divisions for sequential instruction execution. It will be apparent to those skilled in the art that the conventional operations of instruction execution and stage divisions in the processor are not limited to the drawing.

Again, the power switching unit 20 includes the transistors for supplying power to the corresponding stages. As shown in FIG. 1, the conventional power switch is provided to collectively supply and cut off power to the corresponding circuit of the stages. When switching to a sleep mode, a power control circuit 30, which will be described later, cuts off power to the logic circuits corresponding to all of the stages in their respective entirety only after operations by the final stage 5 have been completed. Additionally, when returning to a normal mode from a sleep mode, the power control circuit 30 simultaneously supplies power to the logic circuits corresponding to all of the stages in their respective entireties.

The power control circuit 30 controls the all of the switches P1, . . . , P5 collectively to supply power simultaneously, or collectively to cut off power simultaneously.

Considering the above configuration, the operation of the logic circuit corresponding to each stage and termination of pipeline instruction execution occur sequentially.

SUMMARY OF THE INVENTION

An embodiment of the present invention provides a processor capable of reducing a wake-up latency elapsed until entering a normal mode and/or operating stably when switching a power mode, and a method for managing power therein.

An embodiment of the present invention also provides a processor capable of reducing power consumed by a circuit corresponding to the stages of a pipeline by setting idiosyncratic times at which power is switched to/from each stage, and supplying and cutting off power sequentially to each stage when switching a power mode, and a method for managing power therein.

One or more embodiments of the present invention provide a processor including a plurality of logic blocks corresponding to each of a plurality of stages and having power switches, and a power controller to selectively control the power switches of the plurality of the logic blocks pursuant to at least one of a stage-by-stage basis and a block-by-block basis according to idiosyncratic wake-up latencies of the plurality of the logic blocks, respectively. Additionally, given that instructions are processed sequentially, power is sequentially cut off to the instruction-completed logic blocks when switching to a sleep mode. Consequently, one or more embodiments of the present invention significantly can improve power consumption by recognizing and acting upon idiosyncratic wake-up latencies and/or cutting off power to the logic blocks that do not require power.

In one or more embodiments of the present invention, each of the logic blocks further includes a monitoring unit via which the wake-up latency can be measured.

In one or more embodiments of the present invention, a power controller is provided for controlling such monitoring units in the logic blocks to obtain the respective wake-up latencies and a memory is provided for storing the wake-up latency for each logic block.

One or more embodiments of the present invention provide a method of managing power in a processor having a plurality of sequential stages by sequentially supplying power at different times according to idiosyncratic wake-up latencies for the logic blocks on an instruction processing path, respectively. Such a method includes measuring wake-up latency of a logic blocks pursuant to one of a block-by-block, storing the measured wake-up latency in memory, providing a power controller sequence with a variable switching interval when returning to a normal mode from a sleep mode based on wake-up latency data of the memory, and cutting off power of the logic blocks sequentially according to completion of operations in each logic block when switching to a sleep mode from a normal mode.

Additional features and advantages of the present invention will be more fully apparent from the following detailed description of example embodiments, the accompanying drawings and the associated claims.

BRIEF DESCRIPTION OF THE DRAWINGS

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

Figure 1:
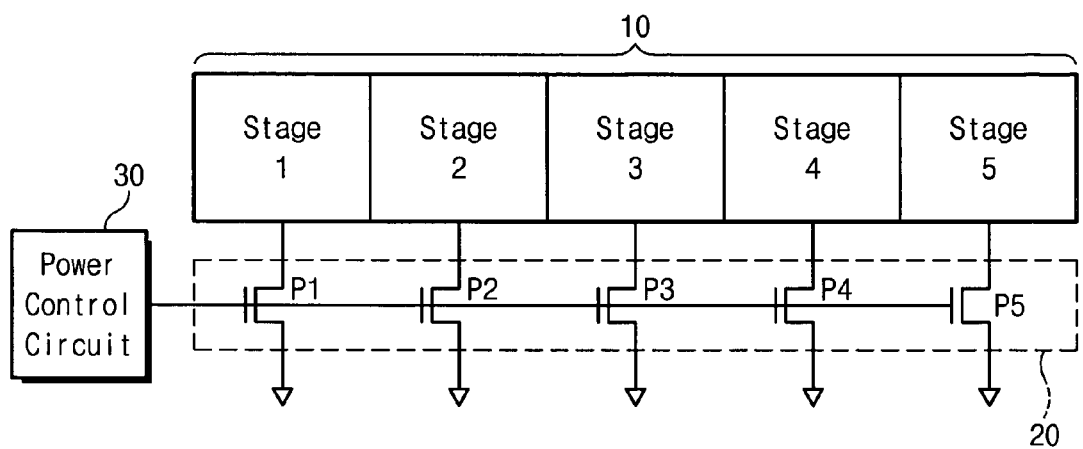
FIG. 1 is a block diagram of sequential stages that execute instructions in a conventional microprocessor, according to the Related Art.

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Reference will now be made in detail to example embodiments of the present invention, which are illustrated in the accompanying drawings. However, the present invention is not limited to the embodiments illustrated herein after, and the embodiments herein are rather introduced to provide easy and complete understanding of the scope and spirit of the present invention.

In developing the present invention, the following observations were made. In the Related Art, the logic circuit corresponding to a stage that no longer is participating in the pipelined instruction execution still consumes power during a wake-up period because supplying and cutting-off power is to the switches P1, . . . , P5, done at the same time for each. Additionally, when executing the wake-up operation, since a size and/or power consumption of the logic block corresponding to each stage is different, the associated wake-up latency is different, so as a result it is impossible to execute instructions in any of the logic circuits of the stages until the stage having the logic circuit with longest/greatest wake-up latency operates normally. One or more embodiments of the present invention provide more effective power management than the Related Art.

Figure 2:
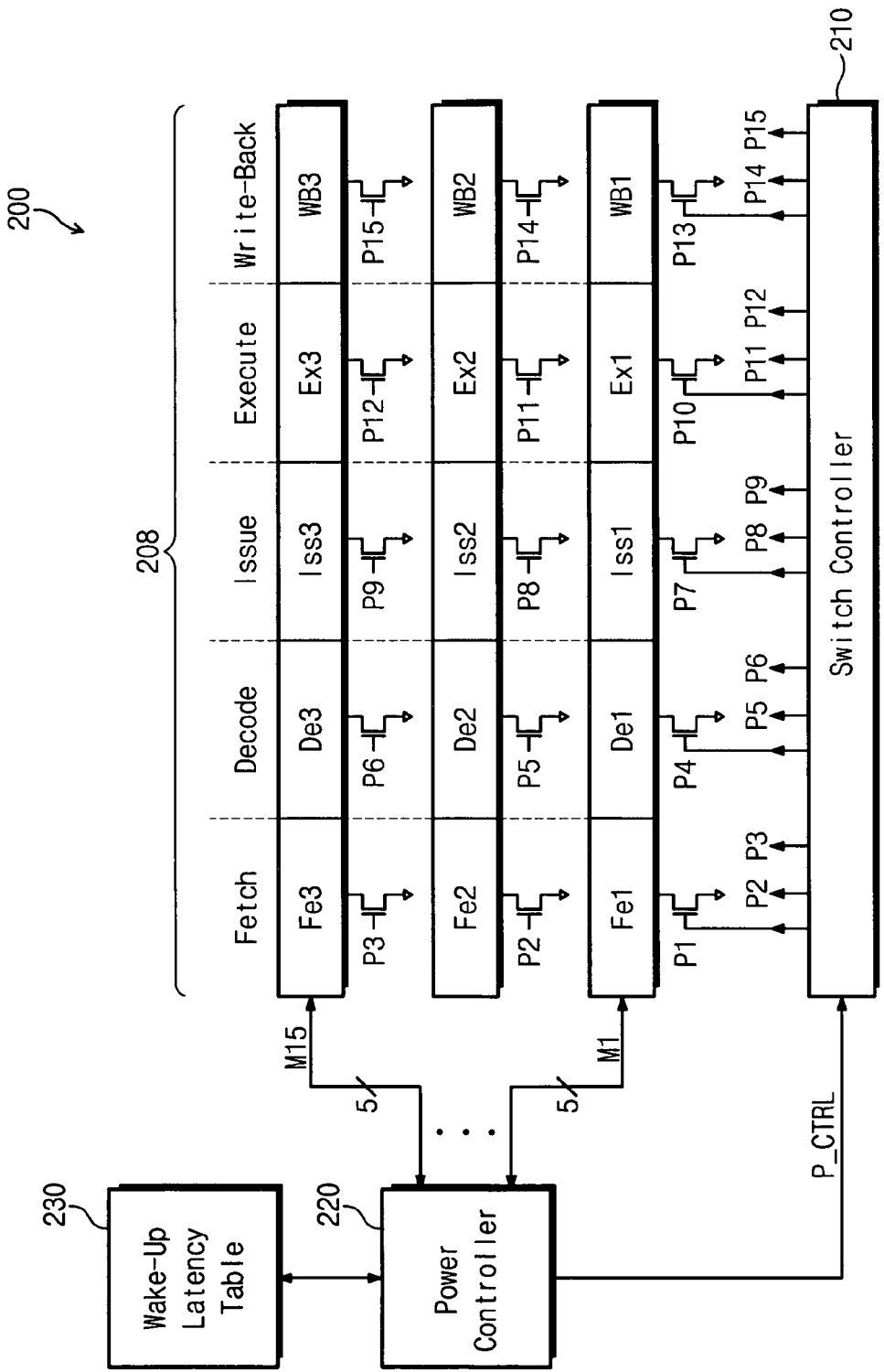
FIG. 2 is a block diagram illustrating a power-managing architecture for a processor having a plurality of stages, according to an embodiment of the present invention.

FIG. 2 is a block diagram illustrating a power-managing architecture of a processor 200 having a plurality of stages, according to an embodiment of the present invention.

In FIG. 2, a processor 200 is provided to control power of stages that sequentially execute instructions. The processor 200 includes a logic block group 208, a power controller 220, a switch controller 210, a power controller 220, and a wake-up latency table 230. The logic block group 208 corresponds to sequential stages of an execution pipeline, and the switch controller 210 supplies or cuts off power to the logic block group 208 via exercising control over the power switch controller 210. The power controller 220 measures the wake-up latency of each logic block within the logic block group 208 to determine an idiosyncratic (and possibly optimized) power supply time, respectively. The wake-up latency table 230 stores the wake-up latency of each logic block as measured by the power controller 220 and supplies the wake-up latency as power control data. The above configuration is directed to aspects of managing power consumption by the processor. As a result, a generalized description about pipelined execution and flow of instructions, which are processed by the logic block group 208 corresponding to each stage of such a pipeline, will be omitted.

The logic block group 208 is divided into sequential stages and logic units. Additionally, the division into sequential stages is a temporal division in the sense of reflecting time that elapses during progression through the execution pipeline, and the stages are divided into the logic units by functional characteristics. A fetch stage for fetching instructions from storage media is divided into the logic block units Fe1, Fe2 and Fe3 according to the respective functional characteristics. Logic block group 208 includes power switches P1-P15 for supplying and cutting off power corresponding to the logic block, respectively. The decode stage for decoding instructions includes three logic blocks De1, De2 and De3 according to the respective functional characteristics. The issue stage for issuing instructions includes logic blocks Iss1, Iss2 and Iss3 according to the respective functional characteristics. Moreover, the execute stage for executing instructions includes logic block Ex1, Ex2 and Ex3, and the write-back stage for writing back instructions includes logic block WB1, WB2 and WB3, according to the respective functional characteristics. Each logic block includes a corresponding power switch.

It will be apparent to those skilled in the art that the present invention is not limited to the particular temporal division and the particular functional division depicted for the processor of FIG. 2. Additionally, when processing instructions in each stage, only necessary logic blocks are used to process the instructions. Accordingly, a path of logic blocks can be varied when processing one instruction. For example, the fetch stage includes three logic blocks and data can be sequentially inputted and processed through two or more of the logic blocks or only one logic block in the fetch stage according to a kind of data. Also, only one logic block or two or more logic blocks in a plurality of logic blocks of each stage can be made to execute an instruction according to the characteristics of data in the decode stage, the issue stage, the execute stage, and the write-back stage, respectively.

The arrangement, according to one or more embodiments of the present invention, by which the logic block group 208 is divided according to function so as to include power switches can provide more specific and accurate power gating operation than was possible according to the Related Art. There can be significant (and possibly substantial) differences between logic blocks in terms of an amount of current and power consumption according to the operation characteristics and/or the number of component devices. Thus, when supplying power, the exhibited wake-up latency varies according to a size of the logic block. Moreover, the latency can be varied by a change of processes in mounting environment. In the above configuration, a progressing path of data can be varied according to the fetched instructions.

The switch controller 210 controls, for each logic block, the corresponding power switch. The switch controller 210 controls each power switch in response to a control signal of the power controller 200, which will be described later. However, the switch controller 210 controls each switch by supplying or cutting off power with a variable switching time in response to a control signal P_CTRL applied from the power controller 220. Additionally, when returning to a normal mode from a sleep mode or vice versa, the switch controller 210 selectively supplies power to the logic blocks, e.g., on the basis of a progressing path of instruction.

The power controller 220 measures and stores the wake-up latency of logic blocks 200 corresponding to a core of the processor. Moreover, the power controller 220 provides an idiosyncratic (and possibly optimized) switching interval and also provides a switch sequence based on the stored wake-up latency when switching to a normal mode from a sleep mode or vice versa. Further, the power controller 220 measures and stores the wake-up latency, which is an elapsed time delay needed for operations of inner devices and/or voltages of nodes, e.g., of a given logical block within the group 208, to reach a stable voltage. Data for the wake-up latencies is obtained via monitoring lines M1, M2 . . . M15 connected to each of the logic blocks. The power controller 220 will be described in more detail below with reference to FIG. 3.

The wake-up latency table 230 stores information of the wake-up latency, which is detected from each of logic blocks through the measurement of the power controller 220, into memory.

Via the above configuration according to an example embodiment of the present invention, power consumption is reduced by the power controller 220 that takes into consideration the wake-up latency in each of the logic blocks when switching to a normal mode from a sleep mode or vice versa in the microprocessor or other processor. Additionally, one or more embodiments of the present invention provide a power control method capable of a prompt mode switch through more accurate wake-up latency time setting.

Figure 3:
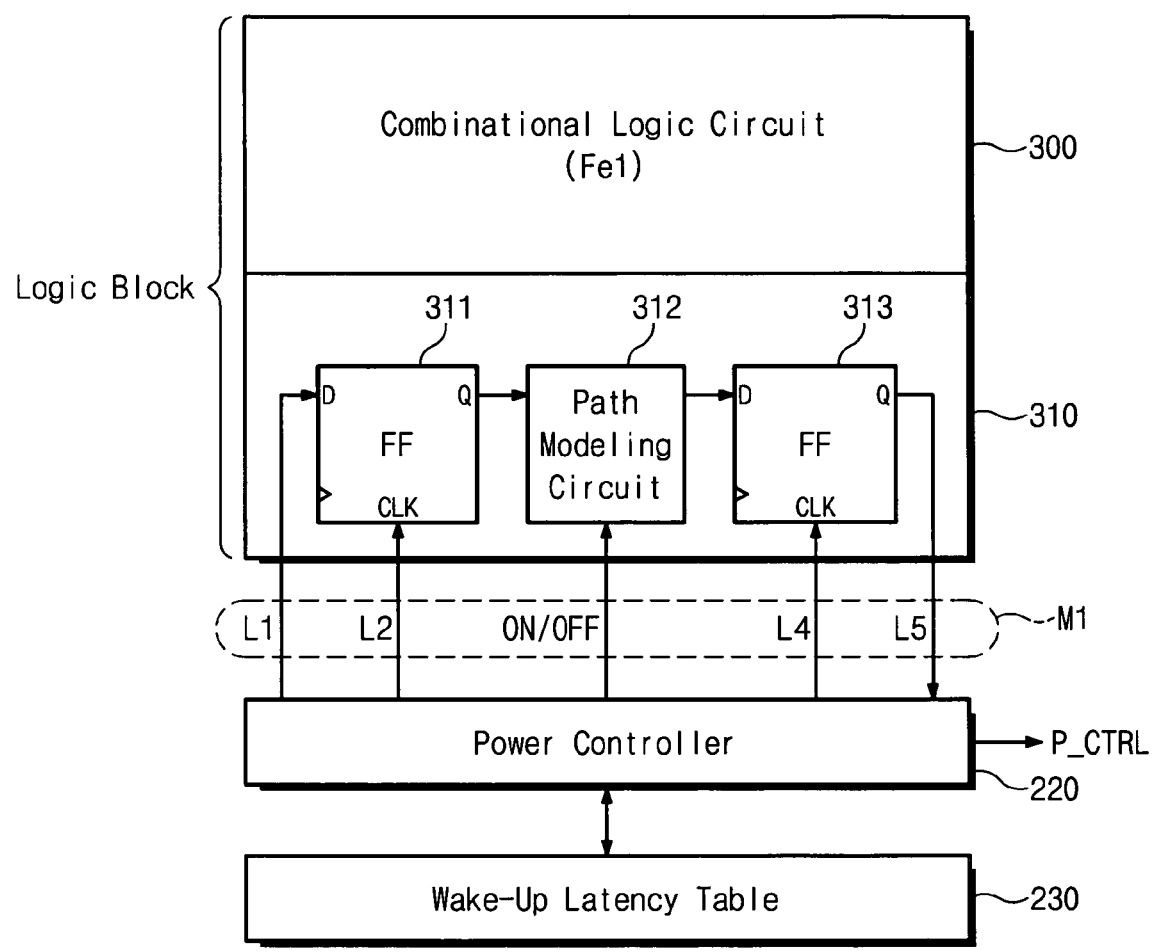
FIG. 3 is a block diagram illustrating (according to an example embodiment of the present invention) a configuration of the logic blocks of FIG. 2.

FIG. 3 is a block diagram illustrating a configuration of logic blocks according to an example embodiment of the present invention, and in the context thereof example operational characteristics of the power controller 220 will be discussed. However, the operational characteristics between the logic blocks and the power controller 220 are not limited to the one logic block Fe1 illustrated in the drawing, and all logic blocks include same components and signal transfer paths. Here, like reference numerals in FIG. 2 denote like elements.

Referring to FIG. 3, each logic block includes a combinational logic circuit 300 for calculating or processing inputted instructions, and a path monitoring circuit 310 for measuring the wake-up latency. The combinational logic circuit 300 computes instructions in the corresponding stage according to the inputted instructions. The path monitoring circuit 310 is provided to emulate the wake-up latency of the corresponding combinational logic circuit 300.

The path monitoring circuit 310 includes a path modeling circuit 312, an input flip-flop 311, and an output flip-flop 313. The input flip-flop 311 inputs a test bit to the path modeling circuit 312. The output flip-flop 313 detects whether the test input bit is normally outputted through the path modeling circuit 312 or not. The path modeling circuit 312 is modeled to represent a maximum signal propagation path in the combinational logic circuit part 300, and has input and output characteristics and/or temperature characteristics substantially (if not completely) identical to that of devices in the combinational logic circuit part 300.

The power controller 220 measures the wake-up latency of the combinational logic circuit 300 by evaluating the path monitoring circuit 310 for the given logic block. The power controller 220 includes a test input line L1, a test output line L5, an ON/OFF line, and lines L2 and L4. The test input line L1 inputs a test bit to the input flip-flop 311. The test output line L5 detects whether the test bit is outputted normally or not through the path modeling circuit 312. The ON/OFF line supplies and cuts off power to the path modeling circuit 312. Additionally, the lines L2 and L4 clear the two flip-flops 311 and 313.

During such a measurement operation, first of all, a logic value (which eventually will be inputted to the path modeling circuit 312 and developed) is inputted in the input flip-flop 311, and the output flip-flop 313 is initialized with the inverse of that logic value. Next, power to the path modeling circuit 312 is cut off and supplied again. A result bit transferred to the output flip-flop 313 is compared to determine whether the result bit is identical to a value inputted from the input flip-flop 311 or not. When a logic value detected from the output flip-flop 313 is identical to the input value, then the wake-up latency of the given logic block (i.e., the wake-up latency of the combinational logic circuit 300) can be represented by the number of clock cycles that have elapsed from the moment of supplying the power to the path modeling circuit 312 until the moment of detecting of the input logic value at the output flip-flop 313. The time elapsed corresponds to the maximum length of the actual wake-up latency in the combinational logic circuit part 300.

A method and stages for measuring the wake-up latency in the power controller 220 will now be described in more detail with reference to FIG. 4.

Through configuration of the logic block and the power controller 220, the power controller 220 measures the wake-up latency of the all logic blocks and stores the wake-up latency into the wake-up latency table 230, e.g., during booting or initialization of the system. Based on the stored wake-up latency table, the idiosyncratic (and possibly optimized) switching interval of the logic block corresponding to each stage can be known. Moreover, the switch controller 210 can be controlled to make faster (if not the fastest) mode switching with reduced (if not minimized) power consumption possible when switching to a normal mode from a sleep mode or vice versa in a power mode. For example, during wake-up, the power controller 220 can supply power to the stages pursuant to a stage-by-stage scheme and/or a block-by-block scheme according to the stored wake-up latencies. Such schemes can also be used when making a change to the power mode, etc.

Figure 4:
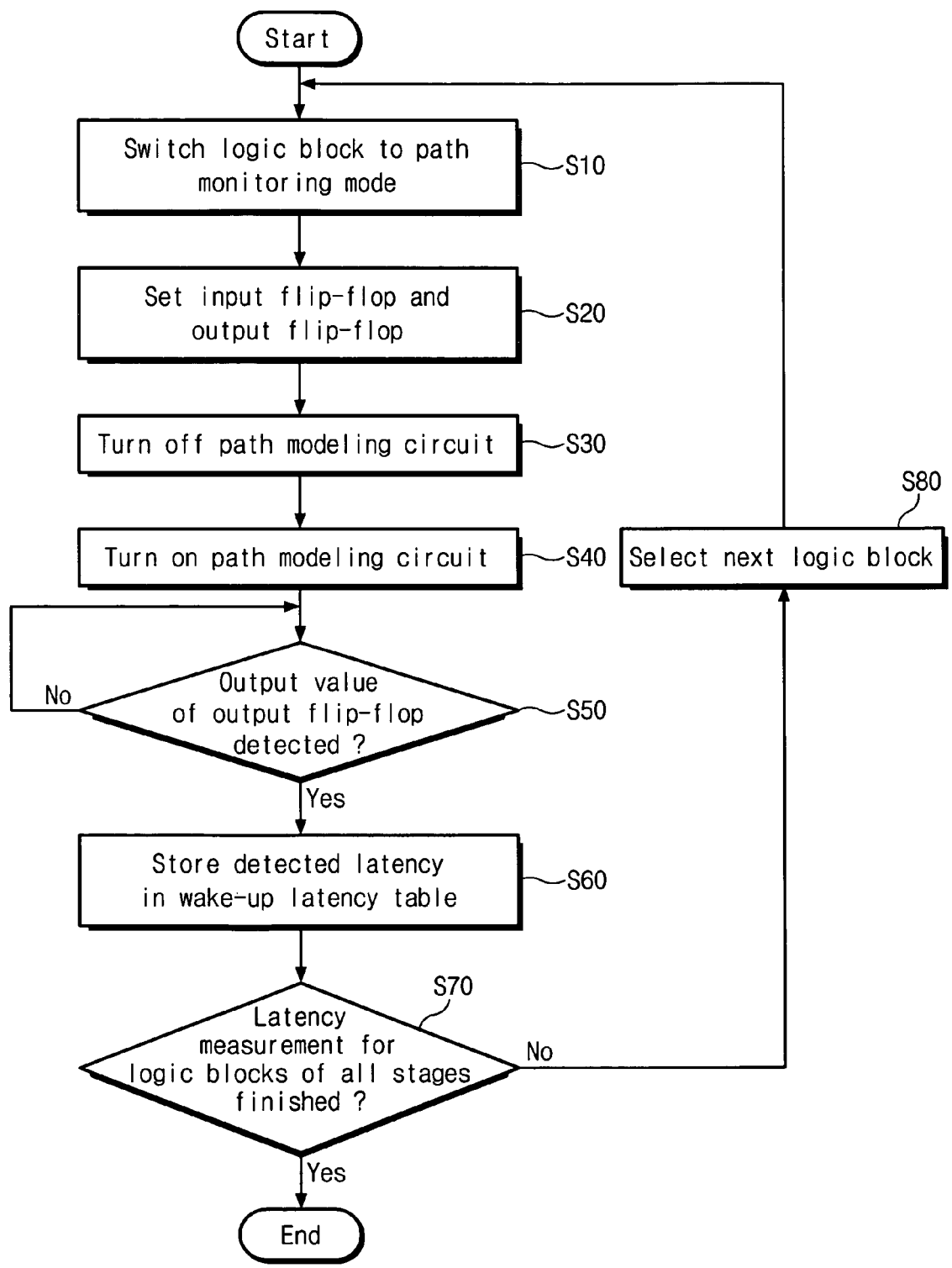
FIG. 4 is a flowchart illustrating a method of operating the power controller in FIG. 3, according to an example embodiment of the present invention.

FIG. 4 is a flowchart illustrating a method of operating the power controller 220, according to an example embodiment of the present invention. The measuring operations (done to obtain the wake-up latency for the corresponding logic block) carried out by the power controller 220 will now be described in more detail with reference to the drawing.

Again, once the operation of measuring the wake-up latency begins, the power controller 220 inputs a test bit to the path monitoring circuit 310 and counts the clock cycles that elapse until a desired result is outputted from the path monitoring circuit part 310. The number of elapsed clock cycles from the moment of supplying power until the moment of outputting the expected result is considered to represent the wake-up latency of the corresponding logic block. A more detailed description will now be made.

The power controller 220 starts operations, e.g., when it receives a mode switching instruction to measure the wake-up latency of a given logic block. The power controller 220 changes the operating mode of the given logic block to a path-monitoring mode that activates the path monitoring circuit part 310; see S10. Next, after clearing the input flip-flop 311 and the output flip-flop 313 in the path monitoring circuit part 310, a logic value stored in the output flip-flop 313 is set to be the inverse of the logic value stored in the input flip-flop 311. For example, when logical one is set in the input flip-flop 311, the logic value of the output flip-flop 313 is set to logical zero; see S20. This is an initialization process that prepares the path monitoring circuit 310 to emulate a time required for a logic value input to the input flip-flop 311 to propagate to the output flip-flop 313 through the path modeling circuit 312. Power of the path modeling circuit 312 is cut off at operation S30. Operations S20-S30 produce a state substantially similar (if not identical) to when power to the corresponding combinational logic circuit 300 is cut off. Additionally, operation S20 puts the path monitoring circuit 310 into a power state corresponding to a sleep mode.

Next, power supply conditions corresponding to when switching to a normal mode from a sleep mode are modeled by supplying power to the path modeling circuit 312 in operation S40. After that, it is detected whether the logic value provided by the output flip-flop 313 has become that of the input flip-flop 311 or not in decision operation S50. During operation S50, the number of clock cycles that elapse while the inputted logic value is being transferred from the input flip-flop 311 to the output flip-flop 313 by a normal operation of the path modeling circuit 312 is counted. When the expected logic value eventually becomes outputted by the output flip-flop 313, the counted number of elapsed clock cycles is considered to be the idiosyncratic wake-up latency of the corresponding logic block 300 and is stored in a memory in operation S60.

Operations S10-S150 are a measurement of the wake-up latency corresponding to one logic block. As such, operations S10-S50 can be applied to iteratively all logic blocks to measure their respective wake-up latencies. It is determined whether measurement of the wake-up latencies for all of the logic blocks corresponding to the stages is completed or not in operation S70. If not, these operations are repeated by selecting the logic block corresponding to the next target in operation S80 and then looping back to operation S10, etc. When the measurement of the wake-up latencies for all logic blocks is completed, the power controller 220 terminates the measurement stage.

Through these operations, the power controller 220 selectively can use the path monitoring circuits 310 in the logic blocks to determine idiosyncratic time delays during wake-up operations exhibited by the corresponding combinational logic circuits 300, respectively. Consequently, the power controller 220 can, via switch controller 210, selectively control the times at which the power switches in each stage are turned on (according to the idiosyncratic wake-up latencies) when switching to a normal mode from a sleep mode. Such a processor, e.g., 200, equipped with sequential stages and the method it implements can reduce unnecessary power consumption and the latency time for instruction execution when switching from a sleep mode to a normal mode.

As described above, the power controller 220, via the switch controller 210, can control the power switches in the logic blocks corresponding to each stage in the processor 200 according to idiosyncratic wake-up latencies (stored in the wake-up latency table 230) that have been determined via use of the respective monitoring circuits 310. In this configuration, a more prompt power mode switch can be achieved by providing an idiosyncratic (and possibly optimized) time interval to reduce (if not minimize) the latency in each logic block when switching a power supply mode in the system. Moreover, power consumption can be significantly reduced by such a switch control scheme that, in recognition of the sequential nature of the pipelined stages, supplies power to logic blocks of a next stage n+1 only after a present stage n is no longer exhibiting its wake-up latency, whereas the related art that supplies and cuts off power to all logic blocks simultaneously.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A processor with a plurality of sequential stages, the processor comprising:

a plurality of logic blocks corresponding to each of the stages and having power switches; and a power controller to selectively control the power switches of the plurality of the logic blocks according to idiosyncratic wake-up latencies of the plurality of the logic blocks, respectively, wherein each of the logic blocks further includes a monitoring unit for emulating the wake-up latency of a corresponding combinational logic circuit therein, and the power controller further is operable to measure the idiosyncratic latency of a given combinational logic circuit using the corresponding monitoring unit.

2. The processor of claim 1, wherein the wake-up latency is an elapsed time from supplying power to the logic block until securing stable operations.

3. The processor of claim 1, wherein the monitoring unit includes:

a path modeling circuit having a device with a data delay time identical to a data path of the corresponding combinational logic circuit;

an input flip-flop for inputting a test bit in an input terminal of the path modeling circuit; and an output flip-flop for receiving an output from an output terminal of the path modeling circuit.

4. The processor of claim 3, wherein the power controller further is operable to provide the test bit to the path modeling circuit through the input flip-flop, and, after supplying power to the path modeling circuit, do the following, detect when the test bit has been transferred to the output flip-flop, count the number of clock cycles that elapse until the test bit is detected at the output flip-flop, and consider the elapsed clock cycles as the wake-up latency of the corresponding logic block.

5. The processor of claim 1, wherein the power controller further includes a memory for storing the measured wake-up latencies for the logic blocks, respectively.

6. The processor of claim 5, wherein the power controller further is operable to supply power to the logic blocks sequentially when returning to a normal mode from a sleep mode according to the wake-up latencies stored in the memory, respectively.

7. The processor of claim 1, wherein the power controller selectively cuts off power to the logic blocks pursuant to one of a block-by-block and a stage-by-stage basis as operations of an instruction process path are completed when switching to a sleep mode from a normal mode.

8. A method of managing power in a processor that operates with a plurality of sequential stages, the method comprising:

measuring a wake-up latency of a logic block corresponding to each of the sequential stages, respectively;

providing a memory that stores each of the wake-up latencies;

storing measured wake-up latencies in the memory;

doing at least one of the following, providing power to the stages at different times when returning to a normal mode from a sleep mode based on the wake-up latencies in the memory, respectively, and cutting off power of the logic blocks sequentially according to completion of operations in each logic block when switching to a sleep mode from a normal mode, wherein the wake-up latencies are measured using monitoring units that emulate the wake-up latencies of corresponding combinational logic circuits in the logical blocks, respectively.

9. The method of claim 8, wherein the wake-up latency is an elapsed time from supplying power to the logic block until securing stable operations.

10. The method of claim 8, wherein each monitoring unit includes a monitoring path providing a delay corresponding to a longest path in the corresponding combinational logic block.

11. The method of claim 8, wherein, when power is supplied sequentially to the logic blocks upon returning to a normal mode from a sleep mode, the respective wake-up latencies are retrieved from the memory.

* * * * *